United States Patent
Anderson et al.

(10) Patent No.: US 9,355,232 B2
(45) Date of Patent: May 31, 2016

(54) METHODS FOR GOVERNING THE DISCLOSURE OF RESTRICTED DATA

(71) Applicant: International Business Machines Corporation, Armonk, NY (US)

(72) Inventors: Sheehan Anderson, Morrisville, NC (US); Eric Arthur Bordeau, Apex, NC (US); Rajasimhan Apprameyan Mandayam, Cary, NC (US); Gilli Mendel, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/904,381

(22) Filed: May 29, 2013

(65) Prior Publication Data

US 2014/0007259 A1    Jan. 2, 2014

Related U.S. Application Data

(63) Continuation of application No. 13/540,060, filed on Jul. 2, 2012, now Pat. No. 9,027,155.

(51) Int. Cl.
  *G06F 7/04* (2006.01)
  *G06F 21/31* (2013.01)
  *G06F 21/10* (2013.01)
  *G06F 21/33* (2013.01)
  *H04L 29/06* (2006.01)

(52) U.S. Cl.
  CPC ............... *G06F 21/31* (2013.01); *G06F 21/10* (2013.01); *G06F 21/335* (2013.01); *H04L 63/0807* (2013.01); *G06F 2221/2115* (2013.01); *H04L 63/168* (2013.01)

(58) Field of Classification Search
  CPC ........... G06F 8/70; G06F 21/10; G06F 21/31; G06F 21/335; H04L 63/0807
  USPC ............................................................ 726/28
  See application file for complete search history.

(56) References Cited

U.S. PATENT DOCUMENTS

| | | | |
|---|---|---|---|
| 7,003,560 B1* | 2/2006 | Mullen | G06Q 10/06 709/223 |
| 7,818,580 B2 | 10/2010 | Bardsley et al. | |
| 7,860,013 B2* | 12/2010 | Michel | 370/241 |
| 8,037,036 B2 | 10/2011 | Blumenau et al. | |
| 8,327,457 B1* | 12/2012 | Ferrara et al. | 726/27 |
| 8,577,761 B1* | 11/2013 | Wookey et al. | 705/35 |
| 2003/0009540 A1 | 1/2003 | Benfield et al. | |
| 2003/0120593 A1 | 6/2003 | Bansal et al. | |
| 2008/0183760 A1 | 7/2008 | Spring et al. | |
| 2009/0076872 A1* | 3/2009 | Gosain | 705/8 |

(Continued)

OTHER PUBLICATIONS

Non-Final Office Action in related U.S. Appl. No. 13/540,060, mailed on Feb. 26, 2014; 14 pages.

(Continued)

*Primary Examiner* — Techane Gergiso
(74) *Attorney, Agent, or Firm* — Schmeiser, Olsen & Watts LLP

(57) ABSTRACT

Described is a method, whereby a creator of an asset at an asset management system selects an identifier corresponding to information related to the asset. The information is stored at a target repository. The asset creator is authenticated with the target repository. An authorization token is output to the asset management system for authorizing one or more users to access the information related to the asset.

24 Claims, 6 Drawing Sheets

(56) References Cited

U.S. PATENT DOCUMENTS

| | | |
|---|---|---|
| 2009/0106431 A1 | 4/2009 | Garfinkle et al. |
| 2009/0182565 A1 | 7/2009 | Erickson et al. |
| 2009/0193394 A1* | 7/2009 | Dasch et al. .................. 717/120 |
| 2010/0138311 A1* | 6/2010 | Pieraldi et al. .................. 705/26 |
| 2010/0242097 A1 | 9/2010 | Hotes et al. |
| 2011/0083177 A1* | 4/2011 | Eddahabi et al. ............... 726/19 |
| 2011/0125894 A1* | 5/2011 | Anderson ............. H04L 9/3213 709/224 |
| 2011/0138169 A1 | 6/2011 | Michel |
| 2011/0145056 A1* | 6/2011 | Sullivan ................ G06Q 30/02 705/14.41 |
| 2011/0191476 A1 | 8/2011 | O'Connor et al. |
| 2011/0265073 A1* | 10/2011 | Vidal et al. .................... 717/170 |
| 2011/0288891 A1 | 11/2011 | Zaid et al. |
| 2012/0047568 A1* | 2/2012 | Keng ................................. 726/9 |
| 2012/0065958 A1* | 3/2012 | Schurig ............................. 704/3 |
| 2012/0066487 A1 | 3/2012 | Brown et al. |
| 2012/0095797 A1 | 4/2012 | Nishimura et al. |
| 2012/0243686 A1 | 9/2012 | Wesby |
| 2012/0300937 A1* | 11/2012 | Burbridge et al. ............ 380/278 |
| 2012/0304248 A1* | 11/2012 | Watts ..................... G06Q 30/06 726/1 |
| 2012/0311095 A1 | 12/2012 | Rahardja et al. |

OTHER PUBLICATIONS

Non-Final Office Action in related U.S. Appl. No. 13/540,060, mailed on Jun. 19, 2013; 8 pages.

Final Office Action in related U.S. Appl. No. 13/540,060, mailed on Sep. 25, 2013; 14 pages.

Rose, DA. et al.; "Language Independent Interfaces for Locale Names/Token Services"; http://www.ip.com/pubview/IPCOM000123026D; IBM TDB, v41, n308; Article 408153; Apr. 1, 1998.

Anonymous; "Data Exchange Token"; http://priorartdatabase.com/IPCOM/000202472; Dec. 16, 2010.

Final Office Action in related U.S. Appl. No. 13/540,060, mailed on Aug. 19, 2014; 17 pages.

Notice of Allowance and Fees Due in related U.S. Appl. No. 13/540,060, mailed on Jan. 2, 2015; 10 pages.

* cited by examiner

METHODS FOR GOVERNING THE DISCLOSURE OF RESTRICTED DATA

RELATED APPLICATION

This application is a continuation application of co-pending U.S. patent application Ser. No. 13/540,060, filed Jul. 2, 2012, entitled "Systems for Governing the Disclosure of Restricted Data", the entirety of which is incorporated by reference herein.

FIELD OF THE INVENTION

The present invention relates generally to the management of software, and more specifically, to the authorization of the sharing of stored data.

BACKGROUND

A definitive software library (DSL) is a secure component in which authorized versions of software package configuration items are stored and protected. An asset management system, such as the IBM Rational® Asset Manager, can be constructed and arranged to include a DSL that tracks software through development, review, and approval processes.

BRIEF SUMMARY

In one aspect, provided is a computer-implemented method, comprising: selecting, by a creator of an asset at an asset management system, an identifier corresponding to information related to the asset, the information stored at a target repository; authenticating the asset creator with the target repository; and outputting an authorization token to the asset management system for authorizing one or more users to access the information related to the asset, wherein at least one of the steps is carried out using a computer device.

In another aspect, provided is a computer-implemented method, comprising: providing, at an asset management system, a link from an asset to a resource related to the asset in a repository; authenticating an asset creator with the repository; and providing an access token to the asset management system in response to authenticating the asset creator, the access token constructed and arranged to provide access to the resource by other users of the asset, wherein at least one of the steps is carried out using a computer device.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
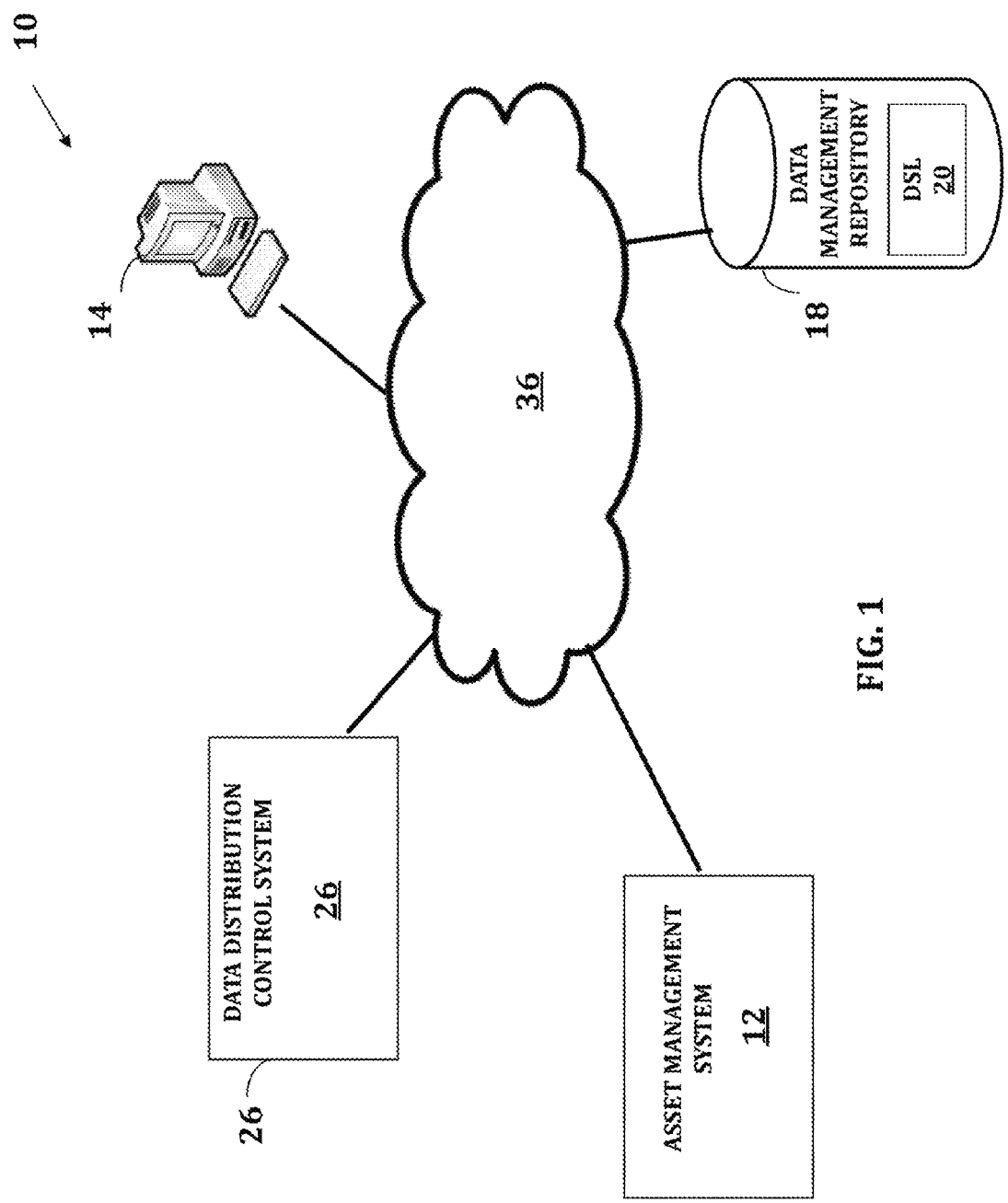
FIG. 1 is a block diagram of a network environment at which embodiments of the present inventive concepts can be practiced.

In the following description, specific details are set forth although it should be appreciated by one of ordinary skill that the systems and methods can be practiced without at least some of the details. In some instances, known features or processes are not described in detail so as not to obscure the present invention.

Asset management systems such as the IBM Rational® Asset Manager can catalog and manage assets, which include a collection of golden software artifacts, or files that can be grouped together to solve a business solution. Artifacts can include work products from software development processes, such as software requirements, designs, models, source code, data, tests, user interfaces, and documentation. Assets can also include metadata, which provides information about the purpose, use, or relationship to other assets, permitting the assets to be traced for reuse and the like. The DSL of an asset management system can process software development outputs, or formal deliverables that a development project provides such as a "golden build" of a package, or generated binary that was scanned and tested. Other outputs can include packages, for example, click on Red Hat package manager (RPM), enterprise archive (EAR), or Java archive (JAR) hyperlinks, or test results output as hypertext markup language (HTML), PDF, or related forms, or documentation, and so on.

A uniform resource locator (URL) is typically used for providing asset traceability. For example, a URL can provide a link to a defect managed by a change management repository, or to a requirement managed by a requirement repository, where many change requests, code versions, and other software items may be allocated. The link can be an open community (OSLC) link or the like.

Asset management system users other than the asset creator, for example, consumers of an install package, typically do not have permission to access a data repository owning resources related to the asset, such as defects, builds, test results, and so on, which are typically located at a different tool/server. Users with permission to access that package, or asset, for example, may desire to fetch summary information corresponding to that package's related resources even though the consuming user does not have direct access to the repository owning these related resources. For example, a user may find it useful to view a link, e.g., from an install package asset, to a test plan summary resource; more specifically, to the test plan name, status, execution result/s, contact/owner information, or related summary information.

In accordance with embodiments of the present inventive concepts, an asset user can receive permission from the asset creator to view summary information corresponding to asset links, e.g., test plans, designs, requirements and so on, stored at a different repository, even though the user does not have the credentials to directly access the data itself directly. To achieve this, the asset creator authenticates with the linked resource target repository to retrieve an access token, and provides the asset management with the permission to use a token that toke in the future to render summary information about that linked resource to asset users, thereby avoiding the need to create a status report or summary document to be published with the asset. The asset management system can use the token to provide a compact rendering of a summary for repository resources linked when the asset user browses for data related to the asset. More specifically, a third party user with access to that software asset can be presented with summary information corresponding to the linked resource utilizing the asset owner's key, and the fact that the asset management server and target repository owning that resource server established a trust as servers can communicate with each other and share data by establishing a friend relationship and configuring OAuth access, referred to as friend servers. In this manner, tokens can be used instead of sensitive credential information to share restricted information between users of a system.

FIG. 1 illustrates a block diagram of a network environment 10 at which embodiments of the present inventive concepts can be practiced.

The network environment 10 provides electronic communications between various electronic devices, including but not limited to an asset management system 12, an asset management user computer 14, a data management repository 18, and a data distribution control system 26 geographically separate from each other and in communication with each other via a network 36. Alternatively, the asset management system 12, the asset management user computer 14, the data management repository 18, and/or the data distribution control system 26 can be directly connected, or co-exist at a same hardware device. The network 36 can include a public switched telephone network (PSTN), a mobile communications network, a data network, such as a local area network (LAN) or wide area network (WAN), or a combination thereof, or other communication network known to those of ordinary skill in the art. The electronic devices 12, 14, 18, 26 can also communicate with one or more information sources, for example, other data repositories. One or more of the electronic devices 12, 14, 18, 26 can include, but not limited to, personal computers, handheld devices, servers, or any other device that can generate and/or receive data or related electronic information. Each of the electronic devices 12, 14, 18, 26 includes a CPU or related processor, a memory device, e.g., a volatile or non-volatile memory, and an input/output (I/O) logic, e.g., a network interface card (NIC), for connecting to the network 36. The processor, the memory, and the I/O logic communicate with each other via a data/control bus and/or data connector, for example, a peripheral component interconnect (PCI) bus. Stored in the memory of the data distribution control system 26 can include program code which, when executed by a processor, can perform functions of the data distribution control system 26.

The asset management system 12 can manage and control the design, development, and consumption of software assets. The asset management system 12 can include a commercial system, for example, an IBM Rational® Asset Manager platform.

The data management repository 18 can include a definitive software library (DSL) 20, in which authorized versions of software package configuration items are stored and protected.

The data distribution control system 26 can facilitate an authorization process between the asset management system 12 and the data management repository 18, for example, providing an authorization token to the asset management system 12 for authorizing one or more third party users, i.e., users other than an asset creator, to receive information, for example, a compact summary rendering for a URL, at the data management repository 18.

In an embodiment, the data distribution control system 26 can notify the asset creator if a token expires. Accordingly, an asset to which the token corresponds can be updated, for example, the credentials can be updated. Alternatively, a new token can be provided that can be stored with the asset at the asset management system 12.

Figure 2:
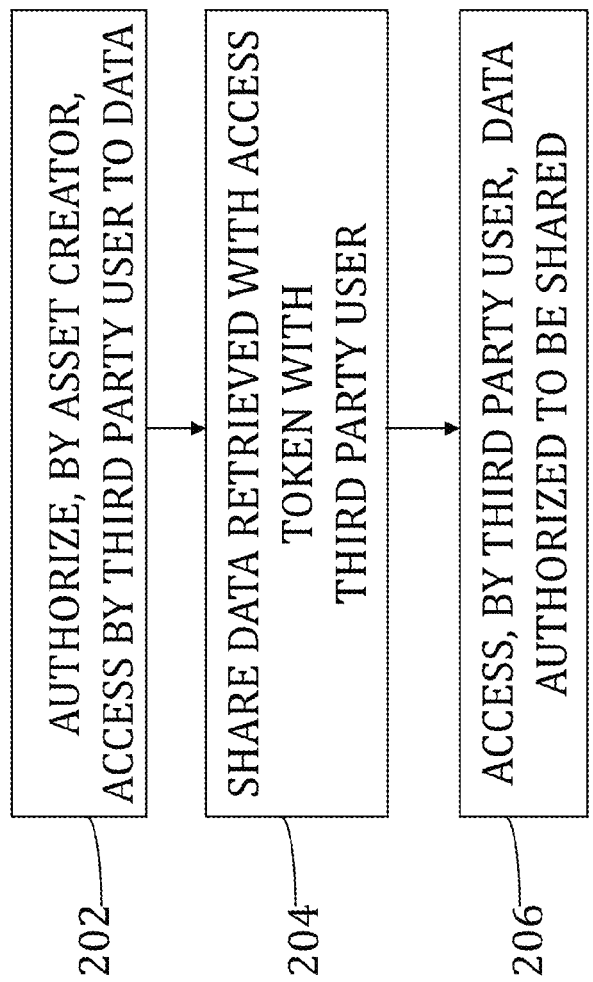
FIG. 2 is a flowchart of a method for sharing restricted data, in accordance with an embodiment.

FIG. 2 is a flowchart of a method 200 for sharing restricted data, in accordance with an embodiment. The method 200 can be governed by instructions that are stored in a memory of one or more electronic devices, for example, the asset management system 12, the asset management user computer 14, the data management repository 18, and/or the data distribution control system 26 of FIG. 1.

At block 202, an asset creator can authorize one or more third party users, access to data at a target repository, for example the data management repository 18. The third party users are otherwise not permitted to access the target repository, for example, due to insufficient credentials or other security-related limitations. The data can be summary information corresponding to the asset, for example, summary information related to defects, requirements, tests, builds, and so on, stored at the target repository. A preferred form of authorization is a token, thereby eliminating the need to share sensitive credential information such as passwords between the asset creator and a third party user. The token includes data that allows a program at the asset management system 12, the asset management user computer 14, the data management repository 18, and/or the data distribution control system 26 to securely connect and share the asset data such as summary information between each other. Here, the user has no access to the token. Instead, the asset management system 12 uses the token to retrieve that data on behalf of the asset creator, and can list the result for the user. The asset creator can instruct the data distribution control system 26, or the data management repository 18 to generate an access token. The token can be generated automatically, for example, in response to the asset creator authenticating with the data management repository 18.

At block 204, data retrieved with the access token can be shared with one or more third party users. The data retrieved with the access token can be shared with other users on the same device, for example, the asset management user computer 14, or shared among users on different computers.

Figure 5:
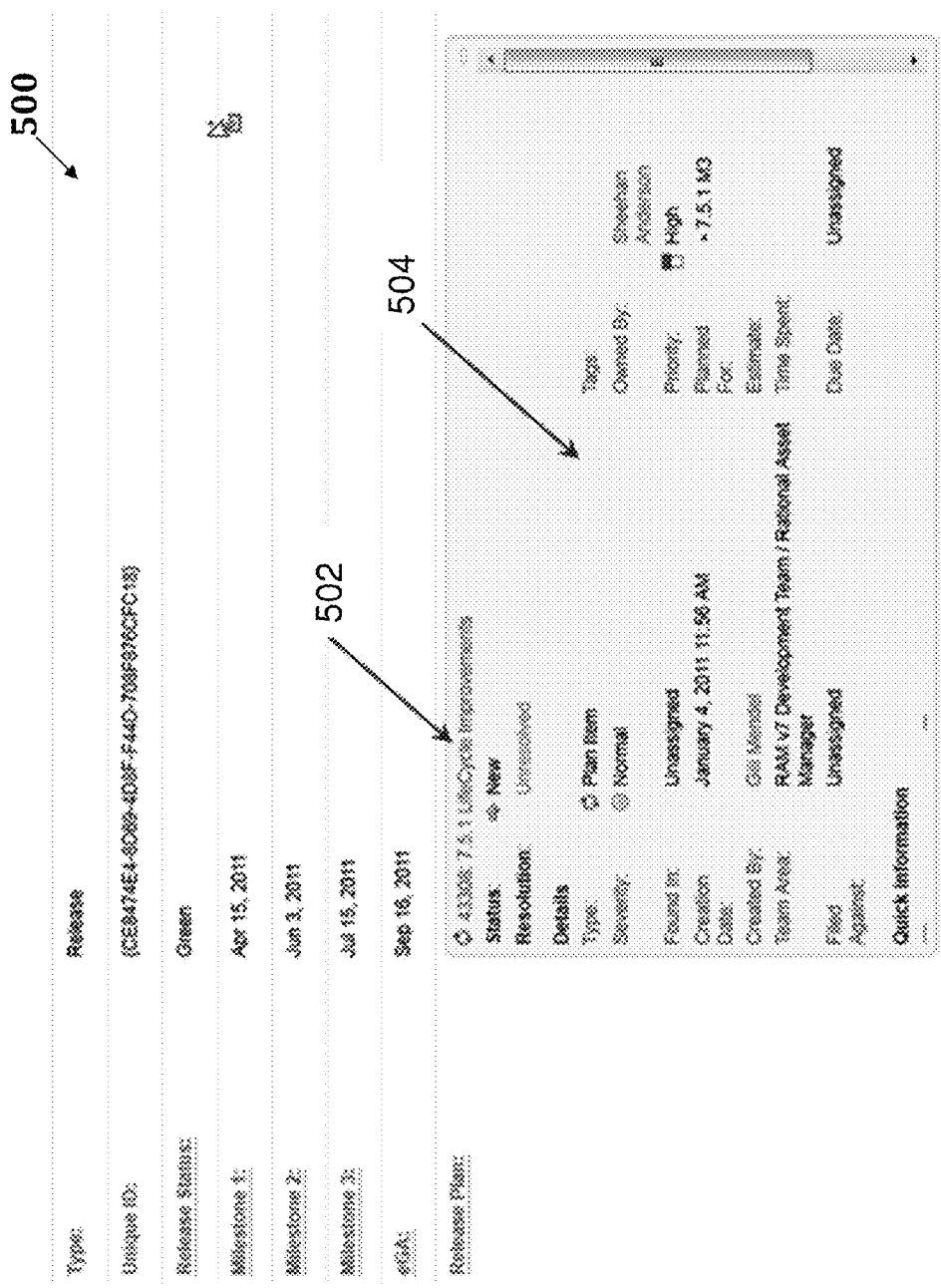
FIG. 5 is a screenshot of a summary corresponding to a traceability link, in accordance with an embodiment.

At block 206, the authorized third party user can access the asset. In doing so, when the user browses the asset, for example, shown in the screenshot 500 of FIG. 5, the user can receive a rendered compact summary corresponding to the URL executed during the browsing session.

Accordingly, the method 200 when performed can permit an asset creator or other user authorized to access source code or other software-related data at a data repository to share a token and the like with a user who does not have direct access to this data, even when this data is stored at another server.

Figure 3:
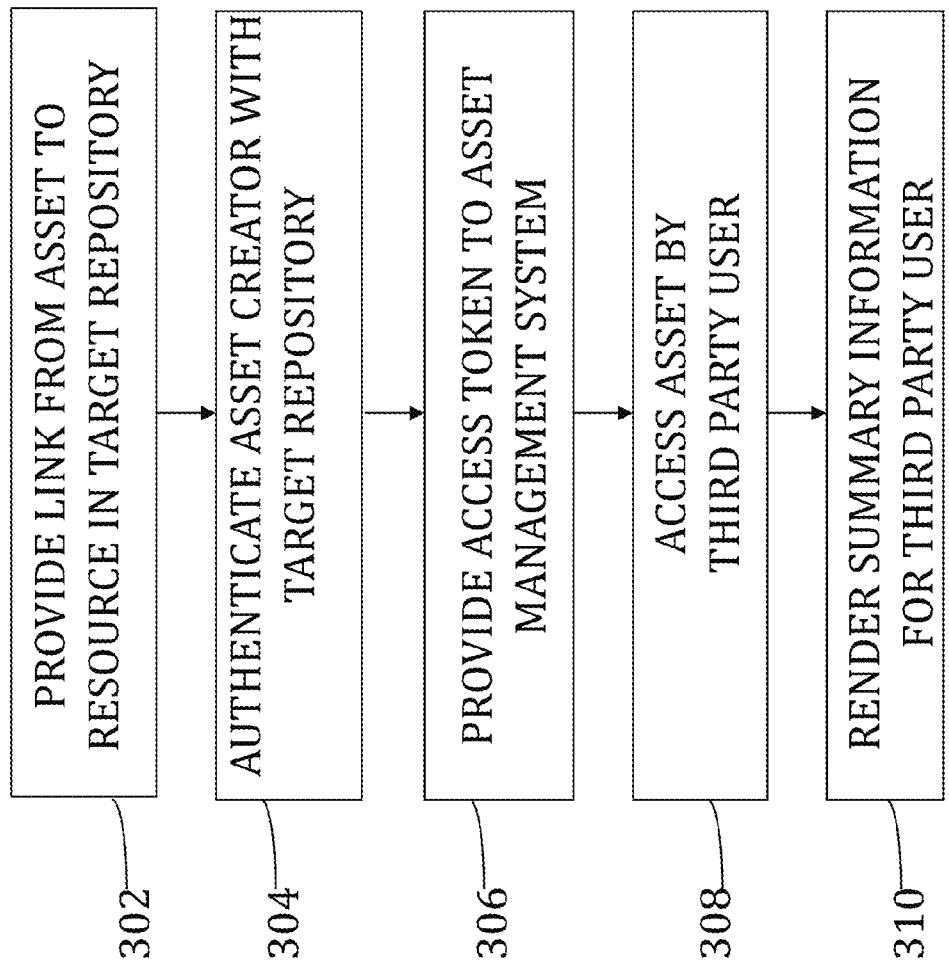
FIG. 3 is a flowchart of a method for controlling a disclosure of restricted electronic data, in accordance with an embodiment.

FIG. 3 is a flowchart of a method 300 for controlling a disclosure of restricted electronic data, in accordance with an embodiment. The method 300 can be governed by instructions that are stored in a memory of one or more electronic devices, for example, the asset management system 12, the asset management user computer 14, the data management repository 18, and/or the data distribution control system 26 of FIG. 1.

At block 302, a link can be provided from an asset to a resource in a target repository, for example, a test data management repository. For example, an asset creator can select a uniform resource locator (URL) that points to a resource at the target data repository 18 related to the asset. In one embodiment, the resource can be information related to defects at a change management repository. In another embodiment, the resource can be a requirement managed at a requirements repository. In another embodiment, the resource can be at a test repository that includes test plans and the like. In another embodiment, the resource can information related to one or more builds, for example, build results generated from assets in the asset management system 12 provided at the target data repository 18. The abovementioned repositories and/or other libraries or data storage facilities, can include asset-related data that provides additional data and traceability to software artifacts or assets to be shared, reused, and or like.

At block 304, a pre-condition arises where the asset management system 12 and the target data repository 18 established a trust domain. An asset creator can authenticate with the target data repository 18. In an embodiment, the oAuth open standard for authorization can be used to authenticate and/or authorize the asset creator with respect to the target data repository 18. An authorization technique such as the open authentication, or oAuth, protocol, can be applied, allowing an asset creator to authenticate with a target repository in a manner that obviates the need for the asset creator to share credentials such as a password.

At block 306, an access token can be provided to the asset management system 12 by the target data repository 18 using the data distribution control system 26. The token is generated by 18 and can only be used by the asset management system 12 for that particular identified resource in the target data repository 18. The token can be constructed to limit the information accessible by a third party user, for example, according to user-defined requirements.

At block 308, a third party user can access the asset. In doing so, the user can browse for data related to the asset by selecting or hovering on the link that provides asset traceability, for example, by attempting to access data at the data repository 18 that is related to the asset such as a test plan.

At block 310, the data distribution control system 26 can process the token, and data related to the oAuth protocol, to render a compact summary rendering for the URL selected by the user, who is authorized on behalf of the asset creator's permissions to receive the summary information.

Figure 4:
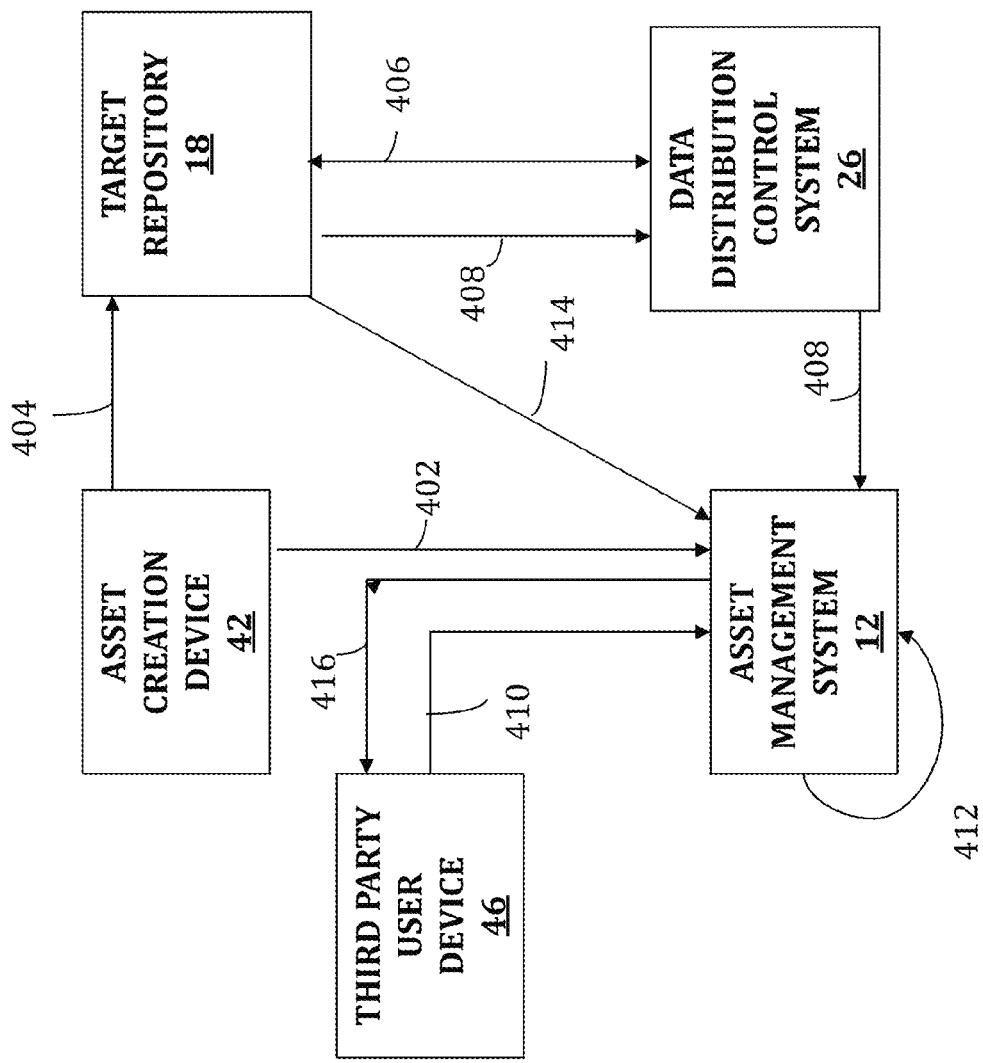
FIG. 4 illustrates data flow paths between elements of a system that authorize users to share data, in accordance with an embodiment.

FIG. 4 illustrates data flow paths between elements of a system that authorize users to share data, in accordance with an embodiment. The system can include an asset creation device 42, a target repository 18, a third party user device 46, an asset management system 12, and/or a data distribution control system 26.

At step 402, an asset creator creates an asset.

At step 404, the asset creator creates a link to a resource at the target repository 18. The asset creator can select at the asset creation device 42 a URL to the resource at the target repository 18.

At step 406, the data distribution control system 26 can manage the authentication of the asset creation device 42 with the target repository 18, for example, to create the link.

At step 408, the target repository 18 can provide the asset management system 12, for example, via the data distribution control system 26, an access token, so that the asset management system 12 can access the resource at the target repository 18 in the future. The data distribution control system 26 and/or the asset management system 12 can store the access token and/or the link information, for example, a URL to which the summary information relates. In this manner, a user can grant a third party user access to information stored with another service provider, without sharing sensitive credentials, and without sharing the full extent of their asset data.

At step 410, a third party user accesses, from a third party user device 46, the asset at the asset management system 12.

At step 412, the asset management system 12, or the data distribution control system 26 processes the access token. At step 416, the asset management system 12 outputs the asset-related data, for example, listing the data provided at step 414 from the target repository 18 according to the selected URL.

Figure 6:
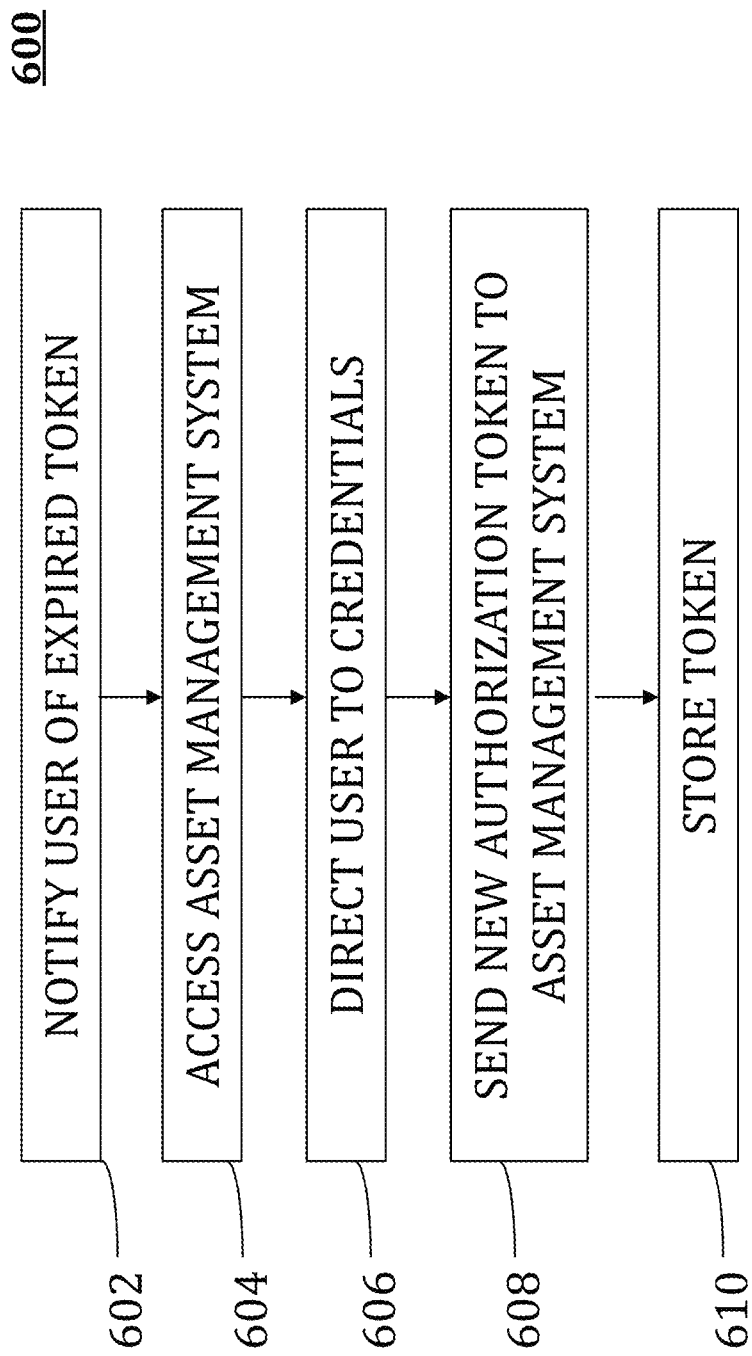
FIG. 6 is a flowchart of a method for responding to a token expiration, in accordance with an embodiment.

FIG. 6 is a flowchart of a method 600 for responding to a token expiration, in accordance with an embodiment. The method 600 can be applied in scenarios where a token expires or where a user wishes to expire a token for security reasons. The method 600 can be governed by instructions that are stored in a memory of one or more electronic devices, for example, the asset management system 12, the asset management user computer 14, the data management repository 18, and/or the data distribution control system 26 of FIG. 1.

At block 602, a user is notified when a token expires. The user can be an asset creator or owner. A token can expire automatically, for example, after predetermined time period or number of accesses. A token can alternatively expire according to a user request. The asset creator 14 can receive a notification of a token expiration via mail, short message (SMS), or other electronic communication.

At block 604, the user can access the asset management system 12, or, more specifically, access an asset.

At block 606, the asset management system 12 redirects user to a target repository 18 where the user's credentials can provided, for example, name, identification, or other security information.

At block 608, a new authorization token can be generated in response to a query for the user's credentials at the target repository 18. The new authorization token can be sent from the target repository 18 to the asset management system 12. Other methods described herein can be applied to process the new token, for example, for authentication.

At block 610, the asset management system 12 can store the new token, for example, to be used by third party users when accessing the corresponding asset.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method, comprising:
    selecting, by a creator of a software asset on an asset management user computer at an asset management system, summary information related to the software asset, the summary information accessible over a network via an uniform resource locator (URL) stored at a data management repository;
    authenticating between the asset creator and the data management repository to authorize access of a third party user to the data management repository;
    automatically generating an access token associated with the authorized third party by a data distribution control system in response to the asset creator authenticating with the data management repository, the data management repository using the data distribution control system to provide the token to the asset management system, the token constructed to limit accessibility by the third party user to only the summary information stored at the data management repository;
    requesting by the third party user data associated with the software asset; and
    providing the requested data being the summary information to the third party user by the data distribution control system processing the token to render the URL of the summary information,
    wherein the third party user has no access to the data management repository except to the summary information accessed in accordance with the token and
    wherein the asset management computer, the asset management system, the data distribution control system and the data management repository are geographically separate from each other and in communication each other via the network.

2. The computer-implemented method of claim 1, wherein the summary information comprises software work product defects.

3. The computer-implemented method of claim 2, wherein the summary information comprises software work product test plans.

4. The computer-implemented method of claim 1, wherein the summary information comprises software development project deliverables.

5. The computer-implemented method of claim 1, further comprising: tracing, by the URL, an origin of the software asset for providing the summary information related to the software asset.

6. The computer-implemented method of claim 1, wherein tracing an origin of the software asset includes linking the software asset to resources at the data management repository that disclose the summary information related to the software asset.

7. The computer-implemented method of claim 1, further comprising: selecting the summary information by the third party user and fetching the summary information corresponding to the third party user associated with the token.

8. The computer-implemented method of claim 1, wherein authenticating the asset creator with the data management repository includes executing a program complying with an open authorization protocol.

9. A computer-implemented method, comprising:
   selecting, by a creator of a software asset on an asset management user computer at an asset management system, summary information related to the software asset, the summary information accessible over a network via an uniform resource locator (URL) link stored at a data management repository;
   authenticating between the asset creator and the data management repository to authorize access of a third party user to the data management repository; and
   providing an access token to the asset management system in response to authenticating the asset creator, the access token constructed and arranged by a data distribution control system to provide access to the summary information by the authorized third party user being other than the creator of the software asset, wherein the third party user communicates directly with the asset management system to access the summary information, and wherein the asset management system uses the access token provided by the data distribution control system to authorize the third-party user access to receive the summary information;
   wherein the third party user has no access to the data management repository except to the summary information accessed in accordance with the token;
   wherein the asset management user computer, the asset management system, the data distribution control system and the data management repository are geographically separate from each other and in communication with each other via the network; and
   wherein at least one of the steps is carried out using a computer device.

10. The computer-implemented method of claim 9, further comprising: using the access token to access data related to the link; and providing the data from the repository to the asset management system to display the accessed data related to the link.

11. The computer-implemented method of claim 9, wherein the link includes a uniform resource locator (URL).

12. The computer-implemented method of claim 11, wherein the summary information includes summary information corresponding to the URL.

13. The computer-implemented method of claim 9, further comprising: tracing, by the link, an origin of the software asset for providing the summary information related to the asset.

14. The computer-implemented method of claim 9, wherein tracing the origin of the software asset includes linking the software asset to resources at the target repository that disclose the summary information related to the software asset.

15. The computer-implemented method of claim 9, further comprising: selecting the link by a third party user other than the asset creator; and using the access token to fetch the summary information for the third party user.

16. The computer-implemented method of claim 15, wherein authenticating the asset creator with the target repository includes executing a program complying with an open authorization protocol.

17. The computer-implemented method of claim 9, further comprising:
   notifying the creator of the software asset when the access token expires;
   accessing, by the creator of the software asset, the asset management system;
   redirecting the creator of the software asset to a repository having credentials related to the creator of the software asset;
   generating a new token; and
   storing the new token at the asset management system.

18. A system, comprising:
   a repository that includes a resource related to a software asset, the software asset including a software package;
   an asset management system that renders summary information corresponding to the resource of the software asset for a third party user on behalf of an asset creation device;
   a control system that authenticates the asset creation device with the repository; and
   the asset creation device providing an access token to the asset management system, the access token constructed and arranged to provide access to the summary information of the resource by the third party user of the software asset, the asset creation device providing the asset management system with permission to use the token to render the summary information to the third party user,
   wherein the asset creation device selects the summary information and authenticates for access to the third party of the summary information from the repository,
   wherein the summary information is provided to the third party user by the control system processing the token to render the summary information accessible over a network via a uniform resource locator (URL),
   wherein the third party user has no access to the repository except to the summary information accessed in accordance with the token, and
   wherein the asset management system, the control system, the asset creation device and the repository are geographically separate from each other and in communication with each other via the network.

19. The system of claim 18, wherein the repository provides data from the repository to the asset management system to display the summary information.

20. The system of claim 18, wherein a link to the summary information includes a uniform resource locator (URL).

21. The system of claim 18, wherein the link traces an origin of the software asset for providing information related to the software asset.

22. The system of claim 21, wherein the origin of the software asset is traced by linking the software asset to the resource at the repository that discloses the summary information related to the software asset.

23. The system of claim 18, further notifying the asset creation device of the software asset when the access token expires, redirecting the asset creation device to the repository having credentials related to the asset creation device, and generating a new token, the asset management system storing the new token.

24. A method to authorize sharing of stored data, comprising:
- creating at least one software asset by an asset creation device, the software asset including a software package stored at a repository having a non-transitory computer readable storage medium;
- authorizing, by the asset creation device in communications with an asset management system, a third party user to receive summary information corresponding to the software asset for the third party user on behalf of the asset creation device;
- authenticating between the asset creation device and the data management repository the authorization access by the third party user to the summary information related to and linked to the software asset, and providing the access management system with the access token for use to render the summary information on behalf of the third party user having no permission to access the repository but having permission to receive the summary information; and
- facilitating, by a data distribution control system, the authorizing process between the asset management system and the repository, which includes providing the access token received from the repository to the asset management system, the third party user being other than a creator of the at least one software asset, the asset creation device providing the asset management system with permission to use the token to render the summary information on behalf of the third party user, and the third party user communicating directly with the asset management system to receive the summary information,
- wherein the asset creation device, the asset management system, the data distribution control system and the data management repository are geographically separate from each other and in communication with each other via a network.

* * * * *